(12) United States Patent
Rosenbaum et al.

(10) Patent No.: US 9,058,809 B2
(45) Date of Patent: Jun. 16, 2015

(54) METHOD AND SYSTEM FOR AUTOMATED SPEECH RECOGNITION THAT REARRANGES AN INFORMATION DATA BASE TO DISRUPT FORMATION OF RECOGNITION ARTIFACTS

(71) Applicant: Walter Steven Rosenbaum, Jerusalem (IL)

(72) Inventors: Walter Steven Rosenbaum, Jerusalem (IL); Joern Bach, Constance (DE)

(73) Assignee: Walter Steven Rosenbaum, Jerusalem (IL)

( * ) Notice: Subject to any disclaimer, the term of this patent is extended or adjusted under 35 U.S.C. 154(b) by 0 days.

(21) Appl. No.: 13/913,434

(22) Filed: Jun. 8, 2013

(65) Prior Publication Data

US 2014/0156273 A1 Jun. 5, 2014

Related U.S. Application Data

(63) Continuation of application No. PCT/IB2012/000148, filed on Jan. 31, 2012.

(60) Provisional application No. 61/554,491, filed on Nov. 1, 2011, provisional application No. 61/438,152, filed on Jan. 31, 2011.

(51) Int. Cl.
*G10L 15/00* (2013.01)
*G10L 15/187* (2013.01)
(Continued)

(52) U.S. Cl.
CPC ............ *G10L 15/06* (2013.01); *G06F 17/3074* (2013.01); *G06F 17/30778* (2013.01);
(Continued)

(58) Field of Classification Search
CPC ..... G10L 15/00; G10L 15/1815; G10L 15/26; G10L 2015/0631; G10L 15/065; G10L 2015/0635; G10L 15/30; G10L 15/32; G06F 12/00; G06F 19/3406; G06F 17/2765; G06F 17/28; G06F 17/30598
USPC ......... 704/251, 231, 235, 243, 252, 270, 257, 704/249, E15.04, E15.009, E15.049, 704/E15.014, 275, 244, 246, 247
See application file for complete search history.

(56) References Cited

U.S. PATENT DOCUMENTS 4,384,329 A * 5/1983 Rosenbaum et al. ............ 704/10
6,484,136 B1 * 11/2002 Kanevsky et al. ................ 704/9
(Continued)

FOREIGN PATENT DOCUMENTS

TW 200937388 A 9/2009

OTHER PUBLICATIONS

Hoch, R. et al., "On virtual partitioning of large directories for contextual post-processing to improve character recognition," Proceedings of the Second International Conference on Document Analysis and Regcognition, 1993, Tsukuba Science City, Japan, Oct. 20-22, 1993, IEEE Computer Society, Oct. 20, 1993, pp. 226-231.

(Continued)

*Primary Examiner* — Abdelali Serrou
(74) *Attorney, Agent, or Firm* — Jerry Turner Sewell

(57) ABSTRACT

A system and a method perform information recognition. The method arranges data base information in a data base information structure. The method matches input information to the data base information using at least one matching algorithm and using a matching information structure. In accordance with the system and the method, the matching information structure differs from the data base information structure.

15 Claims, 6 Drawing Sheets

(51) Int. Cl.
*G10L 15/06* (2013.01)
*G06F 17/30* (2006.01)
*G10L 15/26* (2006.01)
*G10L 15/22* (2006.01)
*G10L 15/32* (2013.01)

(52) U.S. Cl.
CPC ........... *G10L15/26* (2013.01); *G10L 2015/228* (2013.01); *G10L 15/32* (2013.01); *G06F 17/30946* (2013.01); *G06F 17/30292* (2013.01)

(56) References Cited

U.S. PATENT DOCUMENTS

| | | | | |
|---|---|---|---|---|
| 6,526,380 | B1* | 2/2003 | Thelen et al. | 704/251 |
| 6,629,069 | B1* | 9/2003 | Attwater et al. | 704/231 |
| 7,209,923 | B1* | 4/2007 | Cooper | 1/1 |
| 7,689,577 | B2* | 3/2010 | Thelen | 707/999.101 |
| 7,805,299 | B2* | 9/2010 | Coifman | 704/235 |
| 7,809,565 | B2* | 10/2010 | Coifman | 704/252 |
| 8,533,131 | B2* | 9/2013 | Hoge | 706/12 |
| 8,666,745 | B2* | 3/2014 | Saffer | 704/257 |
| 2002/0072896 | A1* | 6/2002 | Roberge et al. | 704/10 |
| 2002/0131642 | A1 | 9/2002 | Lee et al. | |
| 2004/0243562 | A1* | 12/2004 | Josenhans | 707/3 |
| 2004/0254791 | A1* | 12/2004 | Coifman et al. | 704/246 |
| 2006/0020603 | A1* | 1/2006 | Lo Turco et al. | 707/100 |
| 2006/0056696 | A1 | 3/2006 | Jun et al. | |
| 2006/0106607 | A1* | 5/2006 | Atal | 704/254 |
| 2006/0190252 | A1* | 8/2006 | Starkie | 704/240 |
| 2008/0019496 | A1* | 1/2008 | Taschereau | 379/218.01 |
| 2008/0046405 | A1* | 2/2008 | Olds et al. | 707/3 |
| 2008/0126090 | A1* | 5/2008 | Kunstmann | 704/245 |
| 2008/0183471 | A1* | 7/2008 | Atal | 704/254 |
| 2010/0005048 | A1* | 1/2010 | Bodapati et al. | 706/47 |
| 2011/0153327 | A1* | 6/2011 | Iasso | 704/243 |
| 2012/0330947 | A1* | 12/2012 | Huenemann et al. | 707/728 |

OTHER PUBLICATIONS

Ortmanns, S. et al., "Improved lexical tree search for large vocabulary speech recognition," Proceedings of the 1998 IEEE International Conference on Acoustics, Speech and Signal Processing, Seattle, Washington, May 12-16, 1998, IEEE, vol. 2, May 12, 1998, pp. 817-820.

Haeb-Umbach, Reinhold et al., Improvements in Beam Search for 10000-Word Continuous Speech Recognition, IEEE Transactions on Speech and Audio Processing, vol. 2, No. 2, Apr. 2, 1994, pp. 353-356.

Hackelbusch, Richard, Authorized Officer ISA/EPO, International Search Report for PCT/IB2012/000148, mailed Jun. 28, 2012, 4 pages.

* cited by examiner

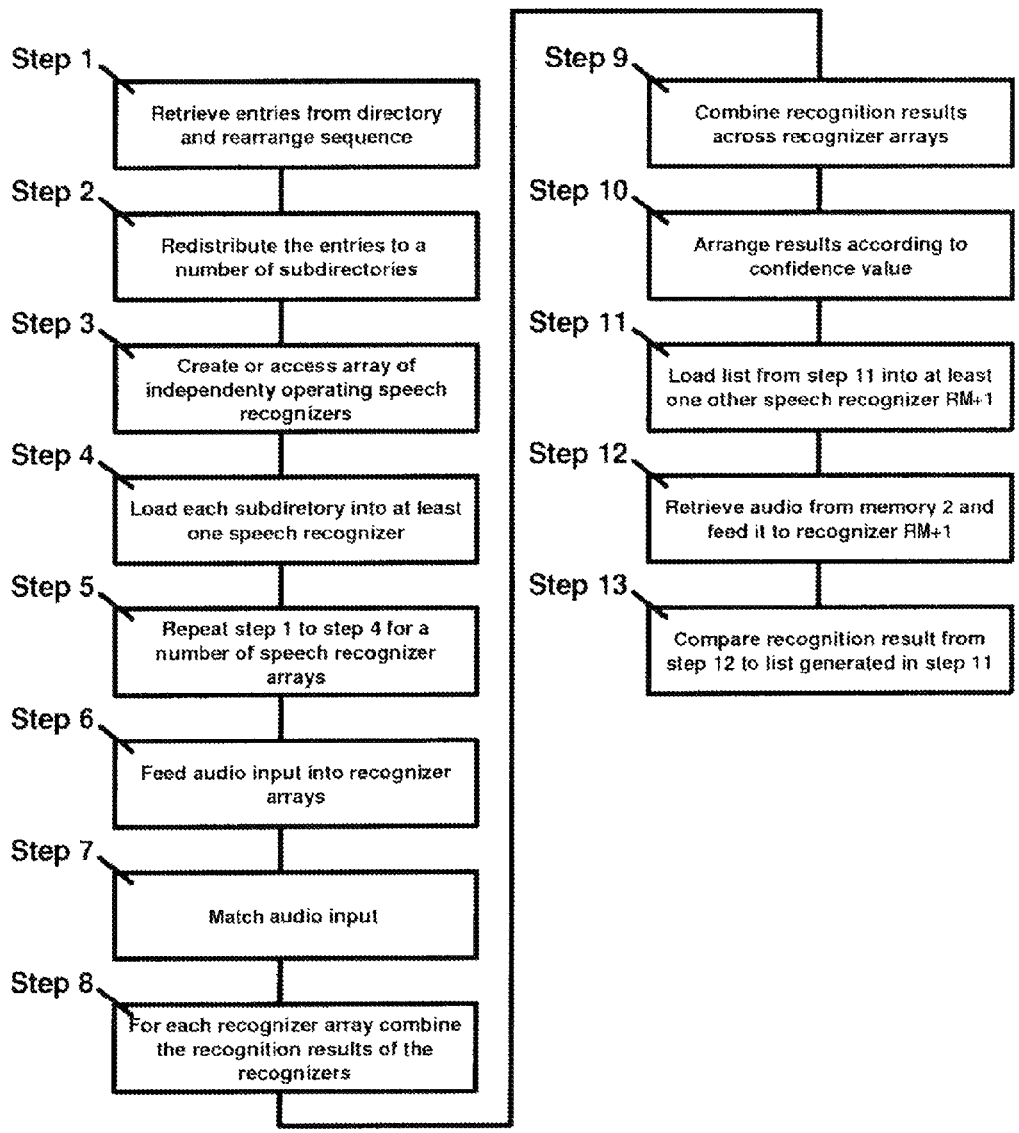

METHOD AND SYSTEM FOR AUTOMATED SPEECH RECOGNITION THAT REARRANGES AN INFORMATION DATA BASE TO DISRUPT FORMATION OF RECOGNITION ARTIFACTS

RELATED APPLICATIONS

This application is a continuation application of International Application No. PCT/IB2012/000148 filed on Jan. 31, 2012, which claims the benefit of priority from U.S. Provisional Application No. 61/554,491 filed on Nov. 1, 2011, and from U.S. Provisional Application No. 61/438,152 filed on Jan. 31, 2011, all of which are incorporated by reference herein.

BACKGROUND OF THE INVENTION

1. Field of the Invention

The present invention is in the field of information recognition.

2. Description of the Related Art

The need to perform automated speech recognition for large, practically open-ended compendiums of automated speech is arising more frequently in state-of-the art applications of automated speech match.

The invention described in the following text may address two issues:

a) If an automated speech recognition directory's internal architecture is based on a given structure, there is a positive likelihood that consecutive entries share a certain degree of similarity. This can be observed, for example, in directories with an alphabetic dictionary-like structure or in cases where consecutive entries represent variations or permutations of one entry of higher order. When an automated speech recognition program scans such a directory in order to find a match for an audio input the occurrence of artifacts based on this proximity of similar entries is likely, which may compromise recognition quality. Therefore there exists a need for a method that ensures that the entries in an automated speech recognition directory are as dissimilar as possible.

b) Automated speech recognition software is usually optimized for directory files of a certain maximum size. Larger sizes not only slow down processing speed but also compromise the recognition quality. Since directory sizes in industrial applications often surpass this maximum size, there exists a need for a method that allows the software to adapt to those larger directories, either for automated speech recognition application, or other intelligent matching and recognition processes such as for example, automated speech recognition and automated speech matching based applications. For brevity in the following automated speech recognition refers to the fully spectrum of such applications.

SUMMARY OF THE INVENTION

The invention is related to a method and a system for information recognition. In general, input information is matched to data base information. The matching may be a comparison between the input information and the data base information. Preferably the matching is achieved by a matching algorithm, which may be stored as a computer program in a program data base.

The data base information may be information stored in a data base, like a plurality of entries of a directory. Before the match the data base information is arranged in a data base information structure which might be a specific order, like an alphabetic order, a numeric order, an order of relevance, or the like, depending on the kind of data base information. In general, the structure may be any information structure or data structure suitable for storing in a data base.

According to the invention, for the step of matching, the data base information is rearranged into a matching information structure which differs from the data base information structure.

Preferably the matching algorithm is then applied to the data base information and the input information is matched to the rearranged data base information. The matching information structure—or in other words: "structure of data base information for matching"—can be any order suitable for the matching process. The matching information structure may be any structure in which the data base information is restructured, or a structure in which the match is performed, like a matching structure or a matching order. That means it is possible to restructure the data base information structure—like an order of entries in the data base, for instance—into a matching information structure—like another order of the entries in the data base—and perform the match with this matching information structure. Or the data base information structure is left as it is, and during the matching process data are picked in a suitable order from this data base, this order of picking being a possible kind of matching information structure. Of course, other ways of restructuring or more general: using the matching information structure for said matching, are possible as well.

The invention described in the following disclosure refers primarily to processes of automated speech recognition. However, the same procedures can also be employed to other automated procedures of pattern recognition, where a certain input, characterized by a certain structure has to be identified by comparing parameters of that structure or corresponding to such a structure with parameters of items contained in data base, termed here as "directory", the input being finally identified by finding in such a data base an item whose parameters show a certain correspondence to the parameters of the input. Since the prerequisite of all such procedures is that said parameters are digitally processed into a form of electronic encoding, the process described here can as well apply to all such recognition procedures, may they involve sound or visual or tactile patterns. Preferably these patterns are available or transformable in digital form.

Preferably the disclosed procedures of rearrangement and/or redistribution are followed. However, redistribution of information entries as such is not necessary. It is also possible and still within the scope of the invention that for rearranging the data base information no structural decomposition of the data base information structure or any subset is done, but a predefined scheme of access is applied to the data base information, like accessing the entries—for the purpose of matching—in a matching structure. The matching structure is the structure of matching the input information with the entries of the data base information, e.g., comparing the input information with the entries of the data base information. The matching structure may be the same as the matching information structure; however, it is possible that the matching order differs from the matching information order, depending of how the matching algorithm proceeds.

The data base with its data base information is called "directory" in the following. Accordingly, a subset may be called "sub-directory" without limiting the scope of respective description. The invention described below refers for brevity only to automated speech recognition systems whose purpose is to compare an audio input to entries contained in a data base or directory. This comparison process produces one or multiple lists of entries selected from the directory for their high degree of correspondence to the audio input. The system uses predefined selection criteria to select from such a list or such lists the directory entry with the highest degree of correspondence to the audio input which is then considered the final result of the recognition process.

One invention's objective is to improve the quality of such or other recognition procedures in such systems by addressing, for example, two problems:

Recognition artifacts and/or insecurities resulting from similarity of entries within a directory.

Problems resulting from the limited directory size capacity of speech recognition programs. Confronted with directories that surpass a certain size, recognition quality for such programs can be compromised.

In a preferred embodiment, the invention addresses both of the above issues by randomizing the entries of data base information, a process comparable to a game of cards. The original stack of entries, directory D, is rearranged, like shuffled, so that the original sequence of the entries is destroyed to preferably remove any artifacts resulting from close proximity of similar entries.

In a further step, the content of directory D may then be reorganized into subdirectories, which may be smaller or the same size as the directory, to be employed as speech recognition directories by one or more automated speech recognition programs.

The size and structure of the individual stacks/subdirectories may be adapted to what individual automated speech recognition programs can comfortably handle in a manner that enhances accuracy and throughput among other performance and system parameters.

While with large directories the further step of breaking down the directory to the subdirectory is useful, it may be omitted if the matching means is able to handle the complete directory without dividing into subsets. It may then be useful to rearrange the directory with its data base information structure more than once into a plurality of information subsets, each subset containing the complete data base information, but in a rearranged state. The rearrangement of each subset is different from the other subsets, so that a plurality of matching information structures exists in the subsets, each subset containing an individual matching information structure different from the matching information structure of any of the other subsets. The matching process may then be performed on those large subsets.

After processing the input information, like an automated audio input, through a single or multiple speech recognition programs, a decision is made by the system whether one of the results qualifies as a final result. If no such result can be found, the whole procedure is repeated, with entries from the result list of the last recognition pass being processed analogous to the previous entries of directory D, preferably to be shuffled and then redistributed to the same or different recognition programs.

With regard to the system for information recognition, the system contains a data base containing data base information being stored in the data base in a data base information structure, and at least one matching means containing at least one matching algorithm as computer program. The system preferably contains a rearranging means to rearrange the data base information into a matching information structure, said matching information structure differing from the data base information structure. Alternatively or additionally, the rearranging means may feed the data base information in a matching information structure to the matching algorithm, said matching information structure differing from the data base information structure.

Preferably the system contains a restructuring means to restructure the data base information into information subsets and to feed the subsets to the at least one matching means for matching the input information with each information subset, each subset match resulting in a candidate set of match candidates.

What follows is a brief description of the process in steps. Specifics of those steps can be found in the detailed description of the invention.

Step 1: Rearranging the entries $e_1$ to $e_n$ of a given original list D and distribution of the entries to a number of subdirectories $d_1$ to $d_n$.

Step 2: Associating these sub directories $d_1$ to $d_n$ as recognition directories with one or more automated speech recognition programs.

Step 3: Processing input information, like an audio input, using the matching means, like automated speech recognition program/programs. The program/programs may be associated with subsets or subdirectories, so the matching is performed by the program/programs in association with their associated subdirectories. This procedure produces for each recognition program a list of potential entries selected from the respective sub directories and considered by the program to have a high degree of similarity to the audio input A, in the following termed "candidates."

Step 4: Deciding whether one of the candidates resulting from the processing is accepted as a final result or whether any other predefined termination criteria is present.

Step 5: If no candidate in step 4 could be accepted as final result, the process returns to step 1, using some or all candidates resulting from the processing in step 3 in place of the original directory D. The automated speech recognition programs and their configuration used in this new recognition pass can be identical to the ones used in the previous pass or they can be different. The process can continue iteratively until a result is found or a termination criterion is fulfilled.

Step 5 could be performed as well, even if a candidate in step 4 could be accepted as final result. It would then be a further matching process using some or all candidates resulting from the processing in step 3 in place of the original directory D. In this case it is not necessary to check if the candidates of step 3 could be accepted as final result, but could be taken right away for this further iterative step.

In general, one matching step or one or more further iterative steps may be performed, each using the entries of the data base D or the candidates of the preceding step as data base information. The respective base information may be different in succeeding iterative steps, e.g. one step could use the data base D and a successive step the candidates of the preceding step as data base information, or the other way around.

Especially when using the candidates of the preceding step as data base information it could be reasonable to omit the redistribution of the candidates in subdirectories $d_1$ to $d_n$ in above described step 1. This could, for example, be appropriate if the number of candidates is so low, that redistribution would result in only one or too few entries in each of the subdirectories $d_1$ to $d_n$. Of course, it could on the other hand be useful to omit the redistribution of step 1 at the beginning of the method or at all, or redistribute only if a first information recognition without redistribution was not sufficient successful.

Each step can result in candidates which can but do not need to be checked if acceptable as final result. The number of steps may be predefined or dependent on the quality of one or more of the candidates acceptable as final result. The quality may be measured by a confidence value, rank in a candidate list, or other suitable parameter.

Each iterative step may use one or more of the candidates of the preceding step as data base information. The number of candidates used may be predefined or dependent on the quality of the candidates of the preceding step, the quality being measured by confidence value or other matching value, distance in such value to the subsequent candidate in the list, rank in a candidate list, or other suitable parameter.

Step 5 as described above uses the same audio input A as used in step 3. In some cases, however, it could be advantageous, to use a different audio as input B. Such different audio could be a repetition of the same utterance by the same person which produced the utterance basing audio A, or a different person speaking the same information, for instance, which is then transformed to audio B.

BRIEF DESCRIPTIONS OF THE DRAWINGS

Embodiments in accordance with aspects of the present invention are described below in connection with the attached drawings in which:

FIG. 10 shows another embodiment of the method according to the invention.

DETAILED DESCRIPTION OF A PREFERRED EMBODIMENT

The method and the system are disclosed herein with respect to exemplary embodiments. The embodiments are disclosed for illustration of the method and the system and are not limiting except as defined in the appended claims.

Figure 1:
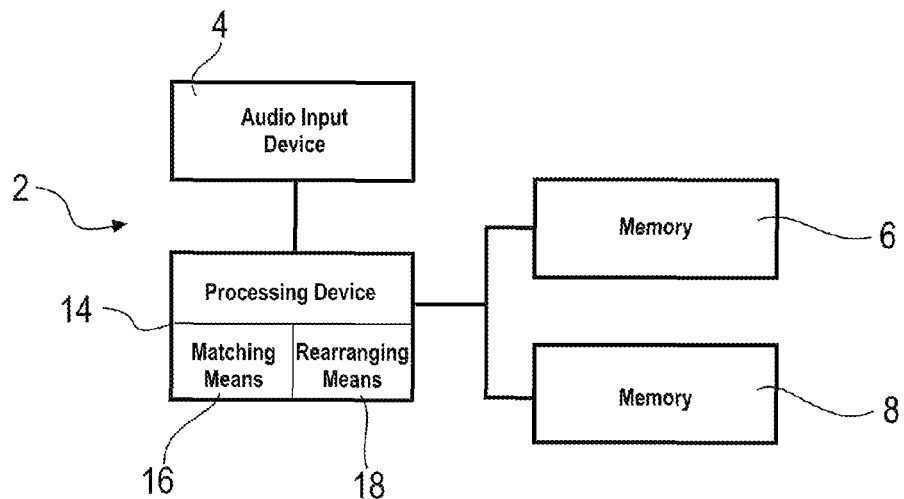
FIG. 1 shows an overview of a preferred embodiment of the system.
Figure 2:
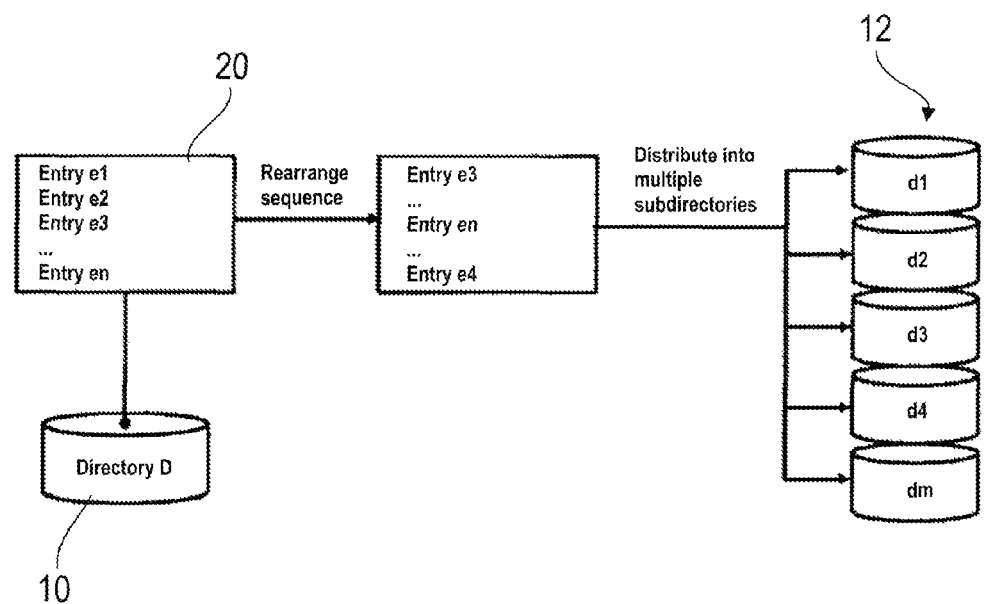
FIG. 2 shows a preferred series of steps to practice the disclosed invention.

The described process improves the recognition quality of an automated speech recognition system. An overview over such a system 2 is shown in FIG. 1. Details of a data base of the system are depicted in FIG. 2. The system 2 as shown in a preferred embodiment in FIG. 1 and FIG. 2 contains an audio input device 4, which could be a microphone, a recording device or any other device to transmit or record audio and voice signals, a memory 6, which is configured to store audio data, and a memory 8 configured to store a number of automated speech recognition programs. It is to be noted that memory 2 and memory 3 are not necessarily separate entities; they may be implemented in a single memory. Also, the system components need not be located together; they may be spatially separated within a confined system (e.g., a computer system) or a geographically distributed system, as long as communications between the system components is possible, e.g., via a bus system and/or communications network. If this is the case, additional components may be introduced to ensure communication between the entities.

Further, the system comprises a data base 10, as automated speech recognition directory D and subsets, as subdirectories $d_1$ to $d_m$.

Further, the system comprises a processing device 14 containing a processor and a number of computer programs for executing processing steps or methods. Together the processor and the programs form means for performing method steps. One of those means is a matching means 16; another means is a rearranging means 18.

The system also contains an energy source or is connectable to an energy source, e.g., a building power network, which is not shown in the diagram.

Figure 3:
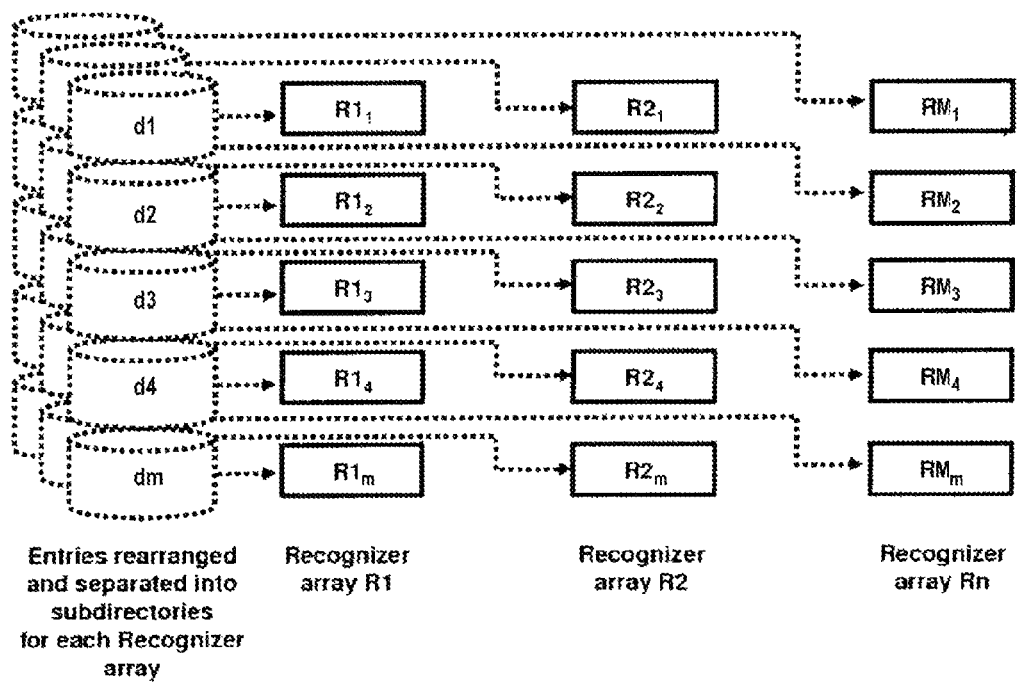
FIG. 3 and FIG. 4 shows automated speech programs.
Figure 4:
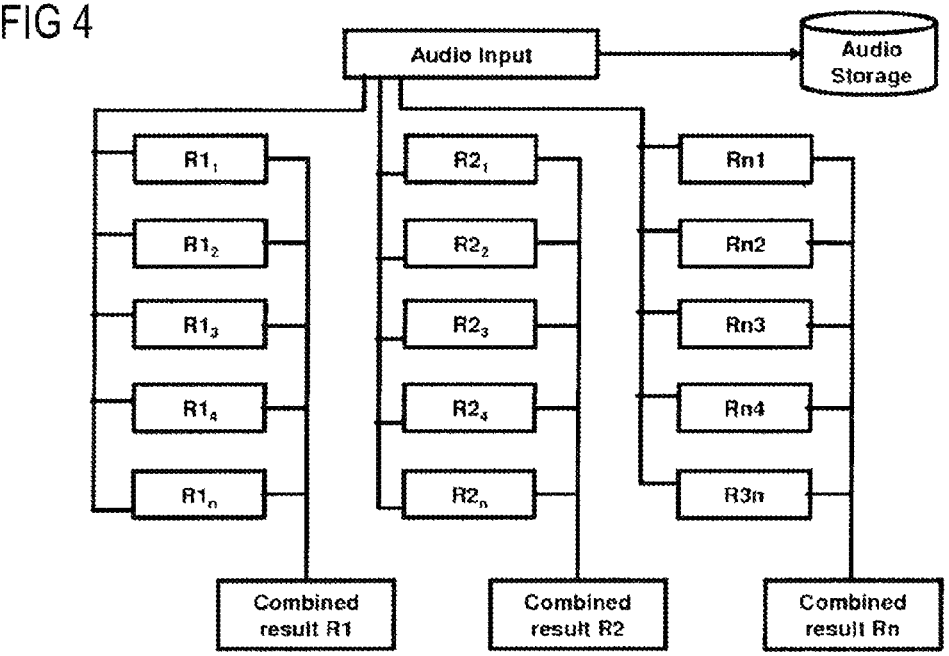

With the matching means 16 the system 2 is prepared to match an audio input against data base information. In FIG. 2 the sum of entries $e_1$ to $e_n$ contained—at least at the beginning of the process—in the data base 10, called directory D in the following, constitute in this embodiment the data base information. The match is performed with the aid of one or more automated speech recognition programs R1 to RM, as shown in FIG. 3 and FIG. 4. The speech recognition programs R1 to RM may be all the same or different from each other, and are named with R in the following for convenience.

Speech recognition programs employed for this purpose may be selected from commonly available speech recognition software such as produced, for example, by Nuance or Loquendo or any other suitable software, but may also be programs with specific performance features such as enhanced performance for the recognition of words from specific languages.

It is further assumed that the entries $e_1$ to $e_n$ in directory D are arranged in a data base information structure, which is likely to be a systematic order. It is, however, possible, that the directory D is, at the time it enters the process, not or no longer structured in such an order because of previous rearrangement procedures.

In this case, steps of the invention intended to rearrange the content of directory D may be deemed redundant and therefore dropped without compromising the invention as a whole. It is also possible and still within the scope of the invention that the following steps, either all or only in parts, refer not to a structural decomposition of directory D or any subdirectory but to an automated scheme of access applied to the unchanged directory.

Figure 5:
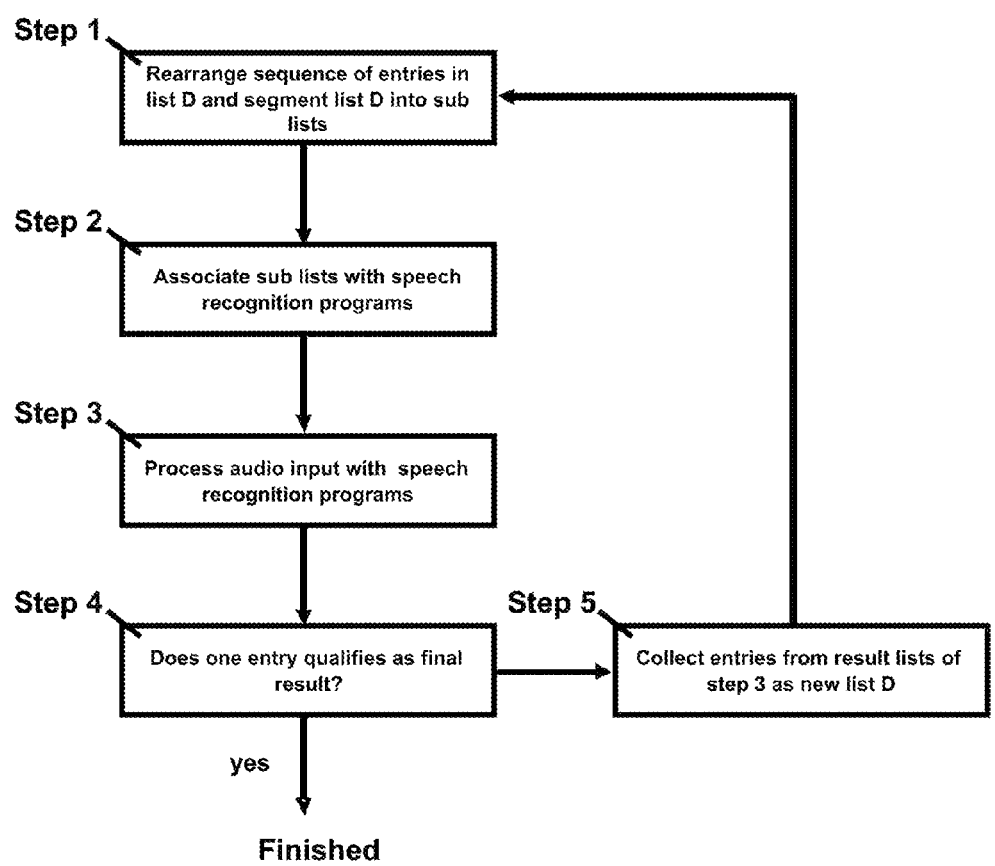
FIG. 5 shows a diagram of a process performed by the disclosed invention

The following process description follows the diagram shown in FIG. 5.

Step 1: The process starts with the rearranging means 1 accessing data base 10 in memory 8, and rearranging the original sequence of entries $e_1$ to $e_n$, as shown in the example of FIG. 2. The data base information or entries $e_1$ to $e_n$ are then rearranged from the data base information structure into a matching information structure.

Then the data base information in the data base information structure is redistributed into a number of subsets or subdirectories $d_1$ to $d_m$, as shown in FIG. 2. This redistribution may be done with or without a separation. If a separation takes place the data base information is distributed into the subdirectories $d_1$ to $d_m$, so that the sum of information in the subdirectories $d_1$ to $d_m$ is the data base information, but arranged in the matching information structure. If no separation takes place, the data base information is contained in each of the subdirectories $d_1$ to $d_m$, preferably arranged in different matching information structures, so that each subdirectories $d_1$ to $d_m$ has its own and individual matching information structure. Of course, any mix of both described procedures with or without separation may be applied, like each of the subdirectories $d_1$ to $d_m$ do not contain the whole data base information but only a part of it, but some entries are in more than one subdirectory $d_1$ to $d_m$.

Optionally the rearrangement into the matching information structure may be preceded by a structural analysis of the content of directory D. Such an analysis could compare structural parameters of this content to certain predefined requirements. Such an analysis could show whether a rearrangement procedure is required or, in case multiple rearrangement procedures are possible, which of these rearrangement procedures is to be selected.

The rearrangement procedure can be based on a randomization algorithm, rearranging the sequence of entries $e_1$ to $e_n$ in a random way, but can also use other algorithms that rearrange items $e_1$ to $e_n$ according to specific rules. Such algorithms may address certain properties of the entries themselves. If, for example, D contains a number of alphabetically ordered words, some of which are specific to a certain language, the rearranging means 18 could select those words and process them in a way that ensures that they are distributed to certain predefined subdirectories.

Such algorithms can also address the relationship between entries, for example, by quantifying a degree of similarity between the entries and rearranging/distributing them in a way that is a function of such similarity. An example for this would be an algorithm like Metaphone that measures relevant phonetic distance between elements in a word list. Entries corresponding to words sounding too similar may then be redistributed either within the directory D or within or between the subdirectories in order to disrupt the forming of recognition artifacts due to their similarity.

Numerous other algorithms are possible depending on the field of application. Information on the specifics of the subsequent segmentation of directory D can also be taken into account for the rearrangement. It is also possible that after segmentation new subdirectories are created to accommodate for entries redistributed from the other subdirectories. The rearranged entries $e_1$ to $e_n$ are redistributed by rearrangement means 18 to subsets or subdirectories $d_1$ to $d_m$. Those subdirectories can be generated by the rearranging means anew for this process, but they can also be already existing entities. Also, new additional directories may be created to accommodate entries. It is also not necessary that all subsets $d_1$ to $d_m$ have the same size and/or number of entries. Their sizes can be adapted to the performance capacity of individual automated speech recognition programs.

It is to be noted that the rearrangement and distribution procedures in step 1 are not necessarily performed in the sequence described—the redistribution may be performed first and then the rearrangement—nor is it necessary that they are separate procedures. They could happen sequentially, with the entries $e_1$ to $e_n$ first being rearranged and then distributed among the subdirectories $d_1$ to $d_m$, or they could happen at the same time, with the entries $e_1$ to $e_n$ being extracted from directory D according to the employed rearrangement scheme and distributed among subdirectories $d_1$ to $d_n$ in the same procedure. This proceeding could be preferable in cases where the original directory D shall remain unchanged.

For this purpose it is also possible to first extract entries $e_1$ to $e_n$ from directory D according to the selected rearrangement scheme, buffer them in an additional—either temporal or permanent—directory and from there distribute them to directories $d_1$ to $d_n$.

It would also be possible to first distribute entries $e_1$ to $e_n$ among the subdirectories $d_1$ to $d_n$ and then to rearrange them within the respective directory and/or between directories.

Another option is that the entries from directory D are not moved at all, but that the following procedures are performed as specifications for search and access algorithms that leave entries $e_1$ to $e_n$ in place in directory D and just access them in a certain way during operation of the system. In this case subdirectories $d_1$ to $d_m$ would not really be separate entities distinct from directory D but the rearrangement/distribution schemes would define the way speech recognition programs R1 to RM access and utilize selected portions of directory D.

Combinations of the above rearrangement/distribution schemes are possible and still within the range of this invention.

Step 2: The individual subdirectories $d_1$ to $d_n$ are associated with speech recognition programs forming speech recognition directories by matching means 16 with either a single automated speech recognition program, multiple independent automated speech recognition programs R1 to RM or to groups of such programs sharing common resources or parameters. Speech recognition programs employed for this purpose may be selected from commonly available speech recognition programs such as those produced by, for example, Nuance or Loquendo, but may also be programs with specific performance features such as enhanced performance for the recognition of words from specific languages.

It is, however, also possible that subdirectories $d_1$ to $d_m$ are, from the beginning of the procedure, already associated with specific speech recognition programs and that this relationship is not addressed during this procedure.

In case multiple automated speech recognition programs are employed, it is preferable to aim for a high degree of diversity between them, such as, for example, by employing programs developed by different developers/companies using different algorithms.

Each automated speech recognition program R1 to RM is associated with either a single or multiple sub directories. FIG. 3 shows an association of each speech recognition program R1 to RM with each of the subdirectories $d_1$ to $d_m$. In another embodiment each of the subdirectories $d_1$ to $d_m$ is associated with only one of the speech recognition programs R1 to RM.

During this allocation procedure, the process may return to step 1 for fresh rearrangement/distribution of entries $e_1$ to $e_n$, or portions of them, before associating individual subdirectories or sets of subdirectories to individual automated speech recognition programs or groups of automated speech recognition programs.

It is also possible that this process takes into account that certain automated speech recognition programs may be specialized or have a higher performance with certain categories of entries. Subdirectories containing such entries can be specifically associated with such specialized recognition programs. An example for this would be to store words from a specific language in special directories that are then allocated to automated speech recognition programs specialized on such languages.

If, however, a single or more than one automated speech recognition program is able to handle a large directory D without problems, the directory D, either as it is or rearranged, may be associated with the one speech recognition program or the respective plurality of programs. If existent, other speech recognition programs not being able to deal with large directory D or not without problems may be associated with one or more subdirectories $d_1$ to $d_m$.

An automated audio input is then fed by the matching means 16 into either the single automated speech recognition program R or the multiple automated speech recognition programs R1 to RM. The audio input can be fed in directly from the Audio Input Device 4 or it can be retrieved from memory 6. If it is directly fed, it is also stored by matching means 16 in memory 6 for use in further iterations of the process.

If only a single automated speech recognition program R is employed, it may process the automated audio input in a serial way by successively employing as automated speech recognition directories subdirectories $d_1$ to $d_m$. This means that the audio input is first compared to the entries within one of the subdirectories, then to the entries within the next subdirectory and so on until all subdirectories have been utilized.

If multiple speech recognition programs are employed, they may either each use as speech recognition directories one or several of the subdirectories $d_1$ to $d_m$ or they can operate in groups sharing the same set of subdirectories $d_1$ to $d_m$.

The matching means 16 employs the speech recognition programs $R_1$ to $R_n$ to process the audio input by matching it against the content of directories $d_1$ to $d_m$. In the case of automated speech recognition, this content may include words, word strings or other verbal expressions, e.g., electronic representations of such. As a result of this matching or comparison procedure, each speech recognition program generates a candidate list that contains entries selected from the employed directory or directories, showing, according to the matching algorithm employed by the respective speech recognition program, the closest similarity to audio input with respect to the matching criteria employed by the respective speech recognition program. For most commercial speech recognition programs, each candidate in such a candidate list is associated with a numerical value, often referred to as confidence value or CV, corresponding to the degree of similarity between the analyzed audio input and the respective candidate.

Step 4: After processing the automated audio input in step 3, the results are examined by matching means 16. Such results usually come in the form of lists produced by each automated speech recognition program; each list containing candidates selected from the speech recognition subdirectory used by the program. Each item may be associated with a numerical value quantifying the probability that the item matches the audio input or this probability may be reflected in the individual position of a candidate within each list.

A final recognition result can be selected from this candidate list in various ways. For a single recognition program, a candidate may qualify as a final result if its CV or the relationship of its CV to the CVs of other candidates in the candidate list conforms to certain predefined values or value ranges. If multiple speech recognition programs are employed, the candidates from the individual candidate lists of the different recognition programs have to be compared and processed in a way that allows the selection of a single entry as final result. Such comparison or voting procedures for the use with single and coordinated multiple speech recognition programs are well known in the field of automated speech recognition and do not require more detailed elaboration.

The matching means 16 examines whether any single of the candidates in the candidate lists produced in step 3 qualifies as a final result. Several potential ways exist to make such a decision.

One method would be to predefine threshold values for the numerical probability value or confidence value, which may be defined globally for all employed speech recognition programs or individually for each speech recognition program. If only one entry appears in the result lists whose probability or confidence value lies at or above such a predefined threshold value, it may be accepted as final result. Multiple other decision methods are possible, involving the individual values of entries, their relationship to other entries in the same list or to result lists of other automated speech recognition programs used. Such decision methods or voting procedures are well known in the area of automated speech recognition and do not require specific description.

Other decision methods may involve comparison between different iterations of this step. If such methods are used, the candidate lists for iterations of step 4 including their CVs and/or the relative position or sequence of the candidates in the specific list have to be stored. One example for such a decision method is to check if a candidate appears in previous iterations of step 4, and, if this is the case, to compare the CVs or the relative list position of this candidate in the different iterations. A candidate could be selected either as a final result or as a member of a group from which the final result is to be selected based on the relationship of the CVs or relative list positions across the different iterations, such as, for example, if the CV in the present iteration is higher or in a higher relative list position than in the previous iteration.

It is also possible that other examination criteria are introduced, which, for example, may terminate the entire procedure if certain conditions are met, such as, for example, a certain number of process iterations or a certain percentage of all candidates' CVs not reaching a certain predefined threshold value.

The above decision methods can be used alone or in combination. Also, decision methods and/or combinations thereof may vary between different iterations of the same step.

Figure 6:
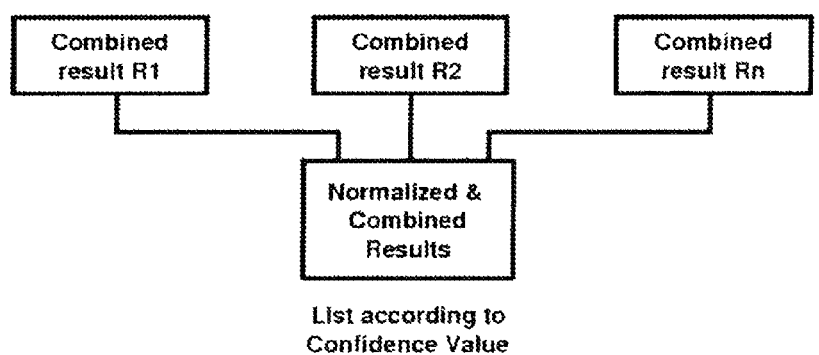
FIG. 6 shows the combination of the recognition results of all recognizers belonging to one of the array R1 to RM.
Figure 7:
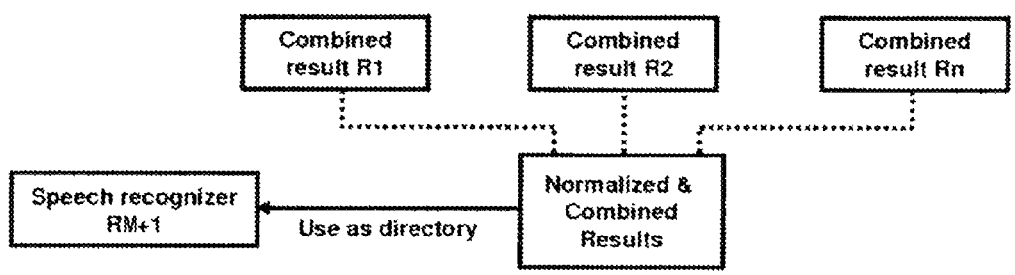
FIG. 7 shows the loading of the generated list as a directory into at least one speech recognizer program.
Figure 8:
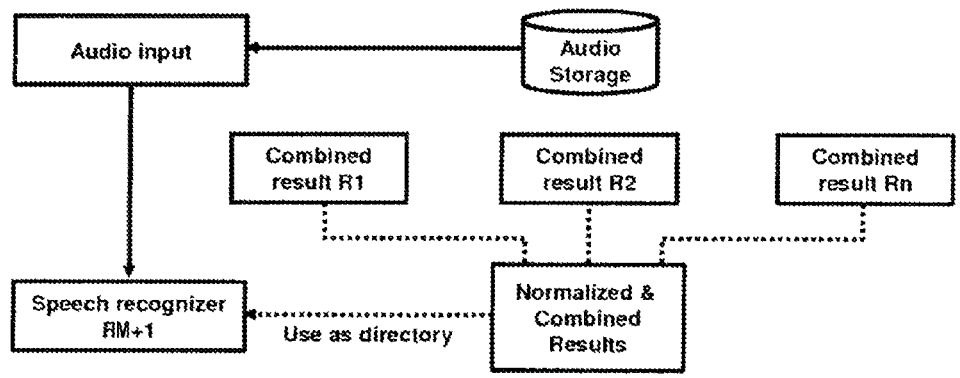
FIG. 8 shows the retrieval of the stored audio input from memory and feeding it into at least one speech recognizer program.

Step 5: A further speech recognition pass is performed (next iteration) either for enhancing the speech recognition results or if the examination in step 4 does not yield a single candidate that qualifies as a final result. There are some possibilities to perform step 5, either alone or in combination. Some of those possibilities are shown in FIG. 6 to FIG. 8.

A first possibility is to select entries from the result lists produced in step 3 by the matching means 16 to form a new directory D. Selection criteria can be the probability or confidence value of the entries, their position within their individual result lists or any other predefined criteria. The result list may come from recognition programs associated with subdirectories $d_1$ to $d_n$ or from one or more recognition programs associated with directory D.

In case step 5 is not the first time performed, but more than one iteration has been performed already, other decision methods may involve comparison between different iterations of this step. If such methods are used, the candidate lists for iterations of step 4 including their CVs and/or the sequence of the candidates in the specific list have to be stored. One example for such a decision method is to check if a candidate appears in previous iterations of step 4 and, if this is the case, to compare the CVs or the relative list position of this candidate in the different iterations. Candidates could be selected based on the relationship of their CVs or their relative list positions across the different iterations, such as, for example, if the CV in the present iteration is higher or in a higher list position than in the previous iteration.

The above selection methods can be used alone or in combination. Also, selection methods and/or combinations thereof may vary between different iterations of the same step.

The procedure then returns to step 1. Some or all entries of the candidate lists of step 3 form the new directory D which may be rearranged and may be divided into subdirectories, as described before. The recognition procedure may be repeated with the same audio input A employed in the first pass extracted from memory 2 in step 3.

The automated speech recognition programs employed in the repetition of step 2 and 3 can be identical to the ones used in the previous recognition pass or different. Also, the configuration of the recognition programs can be the same or different. Especially, if the recognition program of the first pass was associated with the large directory D, the recognition programs used in the second pass or second iteration should be different programs, preferably specialized on smaller directories.

The series of repetitive recognition passes may continue until one of the result entries qualifies as a final result in the repetitions of step 4, or until a termination condition is registered.

For finding a final result, voting may be used, comparing the rank of a result in a subsequent pass with the rank of the same result in one or more preceding passes. A higher rank of the result in a later pass than in a pass performed earlier may be used as evidence for a good result. The same is true if a result maintains a high result (rank 1 to rank 3) over more than one pass.

The voting is advantageous if in the first pass one recognition program is associated with the whole directory D. A degrade in rank of a result may then be used as evidence for a wrong result.

As various changes could be made in the above constructions without departing from the scope of the invention, it is intended that all the matter contained in the above description or shown in the accompanying drawings shall be interpreted as illustrative and not in a limiting sense.

FIG. 10 shows another embodiment of the method according to the invention. The embodiments of FIG. 5 and FIG. 10 are not to be seen isolated from one another, but steps from either method may be intercombined to a new embodiment. Steps 1 to 7 correlate to steps 1 to 3 of FIG. 5.

The speech recognition programs R1 to RM (FIG. 3 and FIG. 4) may be grouped as arrays, either each recognizer R be applied to each subdirectory—$Ri_1$ to $Ri_n$ using the same algorithm, or each subdirectory is associated to its own an individual array element $Ri_1$ to $Ri_n$ each using an individual algorithm.

The recognizer arrays are generated by the matching means 16, which may alternatively access a pre generated array. The matching means 16 loads each of the subdirectories d1 to dm into at least one of the elements or recognizers of the array, for example R1. This may be repeated for multiple independently operating arrays R2 to RM, as illustrated in FIG. 3 and FIG. 4.

Step 8: For each of the recognizer arrays R1 to RM the matching means combines the recognition results of step 7 for the recognizers $R1_1$ to $RM_m$. In a preferred embodiment the recognition results of all recognizers belonging to one of the array R1 to RM are combined (see FIG. 6). In another embodiment only results may be combined that fulfill certain predefined criteria, such as, for example, having values meeting or exceeding a given threshold. Such combination process may also involve a normalization step that transforms the CV of the various recognizer recognition results in a manner that's makes them directly comparable to each other. This step is illustrated in FIG. 6.

Step 9: The matching means combines the recognition results across the recognizer arrays R1 to RM, as illustrated in FIG. 6. Such combination process may also involve a normalization step that transforms the CV of the various recognizer recognition results in a manner that's makes them directly comparable to each other.

Step 10: The matching means 16 arranges the results of step 9 according to their CV.

Step 11: The matching means 16 loads the list generated in step 10 as a directory into at least one speech recognizer program RM+1 (see FIG. 7).

Step 12: The matching means 16 retrieves the stored audio input from memory and feeds it at least one speech recognizer program RM+1 (see FIG. 8).

Figure 9:
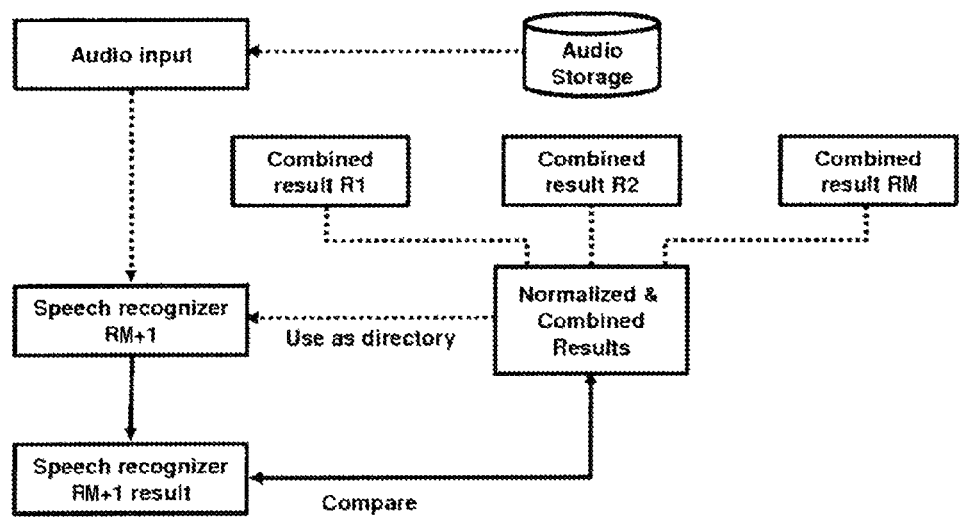
FIG. 9 shows the comparison of the recognition result of the recognizer RM+1 and a list of results arranged in accordance with their confidence values.

Step 13: The matching means 16 compares the recognition result of recognizer RM+1 and the list generated in step 10 (see FIG. 9). If the two lists are identical with regard to previous determined criteria, the first candidate in both lists is selected as the final result. If the lists deviate, repetition of the audio input is requested or another appropriate error handling procedure is activated.

We claim:

1. A method for automated speech recognition, wherein audio input information is matched to data base information stored in a data base by at least one matching algorithm, and wherein before the input information is matched to the data base information, the data base information is arranged in the data base in a data base information structure, the method comprising:

inputting audio input information from an audio input device;

performing a structural analysis of the content of the data base by comparing structural parameters of the data base content to predefined requirements and using the results of the structural analysis to decide whether a rearrangement procedure of the data base information from a data base information structure to a matching information structure is required;

if a rearrangement procedure of the data base information is required:

selecting one of multiple rearrangement procedures based on the result of the structural analysis, the selected rearrangement procedure rearranging the data base information from the data base information structure into a matching information structure which differs from the data base information structure, wherein the selected one of the multiple rearrangement procedures in the step of rearranging performs an algorithm that addresses the relationship between entries of the data base information, which are elements in a word list, by quantifying a degree of similarity between the entries by measuring a relevant phonetic distance between the entries and rearranging the entries in a way that is a function of the degree of similarity;

redistributing entries corresponding to words whose phonetic distance is below a phonetic distance threshold into subdirectories so that the entries whose phonetic distance is below the phonetic distance threshold are separated in different subdirectories in order to disrupt the forming of recognition artifacts due to their similarity; and applying a speech recognition program that includes the at least one matching algorithm to the rearranged data base information and matching the audio input information to the rearranged data base information to recognize the speech content of the audio input information from the audio input device.

2. The method according to claim 1, wherein the data base information structure is an order of entries of the data base information in the data base, the matching information structure being achieved by rearranging the entries in the data base.

3. The method according to claim 1, wherein the data base information structure is an order of entries of the data base information in the data base, the matching information structure being achieved by accessing the entries, for the purpose of matching, in a matching order.

4. The method according to claim 1, wherein:
the data base information is rearranged into a plurality of information subsets;
the input information is matched with each subset; and
each information subset match results in a candidate set of match candidates.

5. The method according to claim 4, wherein the data base information is divided into the subsets, only the sum of all subsets comprising the complete data base information.

6. The method according to claim 4, wherein the data base information is rearranged from the data base information structure into the subsets, each subset containing the complete data base information in the matching information structure.

7. The method according to claim 4, wherein:
the input information is matched in a first match with each information subset, each subset match resulting in a candidate set of match candidates; and
the input information is matched in a second match with some or all of the match candidates retrieved in the first match.

8. The method according to claim 7, wherein the input information being matched in one or more further matches with the match candidates of the respective preceding step.

9. The method according to claim 1, wherein after rearranging the data base information from the data base information structure into the matching information structure the rearranged data base information is distributed into a plurality of information subsets, the input information being matched with each subset, each information subset match resulting in a candidate set of match candidates.

10. The method according to claim 1, wherein after the matching which results in a candidate set of match candidates, the method further comprises:
determining whether one of the candidates resulting from the matching is acceptable as a final result; and
if no candidate is acceptable as a final result, repeating the step of matching the input information to the rearranged data base information with at least one of the found candidates used as new data base information.

11. A system for automated speech recognition with a data base containing data base information being stored in the data base in a data base information structure, the system comprising:
an audio input device that provides audio input information;
at least one matching means containing at least one matching algorithm as computer program to match the audio input information to data base information;
a rearranging means to rearrange the data base information into a matching information structure to be matched with the audio input information by the at least one matching means, the rearranging means performing an algorithm that addresses the relationship between entries of the data base information, which are elements in a word list, by quantifying a degree of similarity between the entries by measuring a relevant phonetic distance between the entries and rearranging the entries in a way that is a function of the degree of similarity;
wherein:
entries corresponding to words sounding too similar, the rearranging means redistribute the entries either within the data base or within or between subdirectories in order to disrupt the forming of recognition artifacts due to their similarity, by grouping words having a measured relevant phonetic distance below a selected threshold level into different subsets;
and
a plurality of speech recognition programs each with a matching algorithm applied to the data base information by matching the audio input information to each subset of the rearranged data base information, wherein the audio input information is matched to each subset by different speech recognition programs, and wherein each information subset match results in a candidate set of match candidates.

12. The system according to claim 11, wherein:
the rearranging means is configured to restructure the data base information into information subsets and to feed the subsets to the at least one matching means for matching the input information with each information subset, each subset match resulting in a candidate set of match candidates.

13. The system according to claim 1, wherein:
the measuring of the relevant phonetic distance between the entries is performed by a Metaphone algorithm.

14. A method for automated speech recognition, wherein audio input information is matched to data base information stored in a data base by at least one matching algorithm, the data base information comprising a plurality of entries stored in the data base, wherein before the input information is matched to the data base information, the data base information is arranged in the data base in a data base information structure; the method comprising:
inputting audio input information from an audio input device;
rearranging the data base information into a plurality of information subsets, rearranging the data base information from the data base information structure into a matching information structure in the subsets which differs from the data base information structure by redistributing data base information corresponding to words whose phonetic distance is below a phonetic distance threshold into subdirectories so that the entries whose phonetic distance is below the phonetic distance threshold are separated in different subdirectories in order to disrupt the forming of recognition artifacts due to their similarity, and
applying a plurality of speech recognition programs each with a matching algorithm to the data base information by matching the audio input information to each subset of the rearranged data base information, wherein the audio input information is matched to each subset by different speech recognition programs, and wherein each information subset match results in a candidate set of match candidates.

15. A method for automated speech recognition, wherein audio input information is matched to data base information stored in a data base by at least one matching algorithm, and wherein before the input information is matched to the data base information, the data base information is arranged in the data base in a data base information structure, the method comprising:
inputting audio input information from an audio input device;

performing a structural analysis of the content of the data base by comparing structural parameters of the data base content to predefined requirements;

deciding, based on the result of the structural analysis, whether a rearrangement procedure of the data base information from a data base information structure to a matching information structure is required, and if a rearrangement procedure of the data base information is required:

selecting one of multiple rearrangement procedures based on the result of the structural analysis procedure; and rearranging the data base information from the data base information structure into a matching information structure which differs from the data base information structure by redistributing data base information corresponding to words whose phonetic distance is below a phonetic distance threshold into subdirectories so that the entries whose phonetic distance is below the phonetic distance threshold are separated in different subdirectories in order to disrupt the forming of recognition artifacts due to their similarity; and applying a plurality of speech recognition programs each with a matching algorithm to the data base information by matching the audio input information to each subset of the rearranged data base information, wherein the audio input information is matched to each subset by different speech recognition programs, and wherein each information subset match results in a candidate set of match candidates.

* * * * *